United States Patent [19]
Jordan et al.

[11] 3,765,918
[45] Oct. 16, 1973

[54] BLENDS OF XANTHOMONAS AND GUAR GUM

[75] Inventors: Wesley A. Jordan; Walter H. Carter, both of Minneapolis, Minn.

[73] Assignee: General Mills Chemicals, Inc., Minneapolis, Minn.

[22] Filed: July 17, 1972

[21] Appl. No.: 272,710

[52] U.S. Cl. ............................... 106/205, 106/208
[51] Int. Cl. ............................................. C08b 25/00
[58] Field of Search .......................... 106/205, 38.5; 260/209

[56] References Cited
UNITED STATES PATENTS
3,384,498  5/1968  Ahrabi .............................. 106/38.5

*Primary Examiner*—Theodore Morris
*Attorney*—Anthony A. Juettner et al.

[57] ABSTRACT

A blend of xanthomonas gum and guar gum which upon hydration exhibits viscosities in excess of the additive viscosities of the components. The xanthomonas gum in the blend is pretreated by heating.

10 Claims, No Drawings

BLENDS OF XANTHOMONAS AND GUAR GUM

This invention relates to blends of xanthomonas gum and guar gum and the method of making such blends. More particularly it relates to blends of xanthomonas gum and guar gum wherein the xanthomonas gum is pretreated.

BACKGROUND OF THE INVENTION

Xanthomonas gum has industrial uses. Sols of xanthomonas gum are plastic in nature and exhibit relatively high gel strengths when compared with sols of other gums. This has been one of the features which has made xanthomonas gum an important commercial gum. High gel strengths are useful in any application in which solid material are to be suspended and stored in a thickened sol. Among such applications are thickening of paints, explosive compositions and drilling muds. Blends of xanthomonas gum with other gums sometimes provided characteristics not offered by the xanthomonas gum alone. Prior to the present invention, practically all xanthomonas gum was capable of high solubilization and when blended with guar gum, the sols exhibit viscosities consistent with the additive viscosities of the components.

SUMMARY OF THE INVENTION

It has now been found that by pretreating the xanthomonas gum, the aqueous sols of blends of the pretreated xanthomonas gum and guar gum will produce viscosities substantially in excess of their additive viscosities. The xanthomonas gum in these blends is readily solubilized. The unexpected increase in viscosity is found in blends containing from about 5 to 95 percent pretreated xanthomonas gum and about 95 to 5 percent guar gum by weight. It has also been found that blends of pretreated xanthomonas and guar gum containing about 10 to 25 percent pretreated xanthomonas gum and about 75 to 90 percent guar gum by weight produce the greatest increase in viscosity over the additive viscosities of the two components. In addition, the aqueous sols of the above blends exhibit very high gel strengths. As described above, aqueous sols of untreated xanthomonas gum have high gel strength as compared to other gums. Aqueous sols of pretreated xanthomonas gum exhibit higher gel strength than sols of untreated xanthomonas gum. Aqueous sols of guar gum alone, on the other hand, exhibit no gel strength. The blends of pretreated xanthomonas gum and guar gum display gel strengths which are more than twice as much as untreated xanthomonas gum alone. As shown in Example VII, a blend containing 90 percent guar gum by weight and 10 percent pretreated xanthomonas gum by weight in an aqueous sol containing 0.5 percent by weight of the blend exhibited the same gel strength as an aqueous sol containing 1.0 percent by weight of the untreated xanthomonas gum alone. Upon heating and cooling, the aqueous sols of the blends do not produce heat reversible gels.

Pretreatment of the xanthomonas gum prior to blending is accomplished by subjecting the xanthomonas gum in the dry state to heating at temperatures of above about 47°C. for periods of time sufficient to induce a capacity to interact with guar gum upon subsequent hydration. Temperatures of about 47°C. require about 6 weeks heating to develop the beneficial effects sought in the xanthomonas gum. Higher temperatures require much less time. When heating is carried out by conduction heating, the rule that the rate of reaction doubles for every 10°C. increase in temperature applies. At temperatures of about 150°C. the reaction time is in the order of about 5 minutes for maximum effectiveness. The treatment can be carried out by convection heating, conductive heating, radiant heating and irradiation heating. Due to the heat transfer efficiency of the different types of heating, different rates of reaction will be obtained when different heating methods are used. Convection heating requires the longest time periods while irradiation heating requires the shortest periods of time.

DETAILS OF THE INVENTION

Xanthomonas gum is a fermentation product produced by the action of the bacteria *Xanthomonas Campestris* upon carbohydrates. Carbohydrates useful in the reaction include simple sugars, such as glucose and fructose, sucrose, starch and starch hydrolyzates. The reaction is carried out in the presence of selected minerals including phosphate and magnesium ions and a nitrogen source, usually a protein. The reaction is conducted in a pH range of from 6.5 to 7.5, preferably 7, and in a temperature range of from 28° to 30°C. In general, the commercial process involves growing the bacteria, inoculating a small batch of fermentable broth with the bacteria, allowing the small batch to ferment, inoculating a large batch of fermentable broth with the previously fermented small batch of broth, allowing the large batch to ferment, sterilizing the broth and finally recovering the xanthomonas gum from the broth.

The fermentation has been carried out by the following procedure. In the first step the bacteria was grown on an agar slant. In the second step bacteria from the slant was used to inoculate 2 liter aliquots of a fermentable broth containing per liter: sucrose, 20 grams; $Na_2HPO_4$, 8 grams; $NaH_2PO_4$, 1 gram; $MgSO_4 \cdot 7H_2O$, 0.25 gram; and 90 grams of cooked soy meal dispersion. The cooked soy meal dispersion was made by agitating at 180 rpm, 90 grams of soy meal in 600 ml. of water at a temperature of 90°C. for a period of 30 minutes and then centrifuging and discarding the residue. The above broth was allowed to ferment for a period of 31 hours at a temperature of about 28° to 30°C. In the third step the broth was used to inoculate a 15 liter batch containing the same broth composition. The broth of the third step was allowed to ferment for a period of 29 hours at a temperature of about 28° to 30°C. The broth from the third step was used to inoculate a 15,000 liter batch of broth having the composition per liter of broth of: sucrose, 20 grams; cooked soy meal dispersion, 6 grams; rapeseed oil, 0.65 gram; sulfuric acid, 0.53 gram; $MgSO_4 \cdot 7H_2O$, 0.25 gram; $Na_2HPO_4 \cdot 12H_2O$, 15 grams and tap water. The final batch was allowed to ferment for a period of about 72 hours at a temperature of about 28° to 30°C. At the end of the final fermentation period the broth was steam sterilized to destroy all the viable microorganisms. The pH of the broth was then adjusted to 7.9 by the addition of potassium hydroxide and the gum was recovered from the broth.

In the above fermentation procedure a phosphate ion is essential for the growth of the bacteria. The particular phosphate salts shown above also act as a buffer to help maintain the desired pH. Other phosphate salts can be used if appropriate steps are taken to control the pH. Different magnesium salts can be used. Xanthomonas gum contains glucuronic acid groups and when the gum is made as described above, one half to three fourths of these groups are neutralized with sodium ions and the remainder with potassium ions. When potassium salts rather than sodium salts are used in the preparation of the gum, this ratio is reversed. Other modifications such as using different nitrogen sources, different selection of potassium and sodium ions, and different acids can be made. In general such modifications will be within ±5 percent of the above amounts of the critical ingredients.

Once formed, the broth containing gum, residues of the chemicals, unconverted sugars, cell walls of the xanthomonas bacteria can be separated from the broth by spray drying or the gum can be recovered from the broth by precipitating with an alcohol, a calcium ion or a quaternary compound at a pH range of about 6 to 7.9. After precipitation, the solvent or liquid media is then evaporated from the fibrous gum particles. One method of evaporating the solvent or liquid media includes placing the wet gum fibers in a rotary drier and continuously rolling the gum fibers while heating to a temperature of about 100° to 120°C. for a period of about 20 to 30 minutes. Another method of evaporating the solvent or liquid media includes centrifuging and then placing the gum fibers on a belt and passing them through a tunnel into which low humidity air having a temperature of about 70° to 80°C. is blown. The evaporating temperatures are traditionally below about 120°C. Higher evaporating temperatures tend to insolubilize the gum. That is, higher evaporating temperatures tend to alter the gum so that it cannot subsequently hydrate in water, ammonia salt solutions, 5% NaCl, 3% KOH and 50 percent acetic acid to the extent that it would had it not been subjected to the high evaporating temperatures. After the solvent or liquid media is substantially removed, the fibers are reduced to a powder by grinding.

The fermentation process, recovery process and evaporating process are not part of the present invention.

The present invention is directed toward subjecting xanthomonas gum in the dry state to heating at a temperature and for a period of time sufficient to induce changes in the gum so that when combined with guar gum and hydrated more than additive viscosities are produced. By xanthomonas gum in the dry state is meant xanthomonas gum having a moisture content of about 6 to 15 percent by weight. This is substantially the moisture range of commercially available xanthomonas gum which has been spray dried or from which solvents and liquid media have been evaporated.

Altering the xanthomonas gum in a manner suitable for interacting with guar gum so that upon hydration unexpectedly high viscosities are produced requires an amount of heating within an approximate given range. Underheating the gum will not sufficiently alter the xanthomonas gum to produce observable increases in viscosity. Overheating the gum causes deterioration of the unique change in the gum. If overheating is carried far enough, it will completely destroy the beneficial effect of heating the gum and insolubilize the gum itself when subsequently dispersed in aqueous solutions of salts, alkali and water-miscible organic solvents.

The heating of the gum can be carried out by convection heating, conduction heating, radiant heating or irradiation heating. As shown below in Example I, convection heating requires the longest period of time to alter the gum. Presumably this is due to the poorer heat transfer characteristics of convection heating as compared to conduction heating and irradiation heating. Conduction heating requires substantially less time to alter the xanthomonas gum than convection heating. Heating by irradiation requires still less time. Presumably the speed at which irradiation heating can alter the gum is due to the penetrating properties of the irradiation and therefore greater heat transfer efficiency. As can readily be appreciated, due to differences in heat transfer efficiency, the particular equipment used to deliver the required amount of heat will determine the particular operating parameters in any particular instance. Therefore, the amount of heat in the range between inducing the benefical effect desired and destroying the beneficial effect is a function of time, temperature and heat transfer properties of the particular equipment used. The amount of conductive heat that has been found to produce maximum viscosities when the pretreated xanthomonas gum is combined with guar gum is equivalent to heating the xanthomonas gum using an oil bath and glass containers for a period of about 4 to 6 minutes at a temperature of 150°C. The time period of heating was measured from the time the temperature of the gum reached 150°C. Using the same means of delivering the heat to the gum, it was found that the rate of reaction followed the rule that with each increase of 10°C. in the reaction temperature there was a doubling in the rate of reaction. Examples of heating parameters which are equivalent to heating at a temperature of 150°C. for a period of 5 minutes are:

| Temperature, °C. | Time, minutes |
|---|---|
| 180 | 0.62 |
| 150 | 5.00 |
| 120 | 40.00 |
| 100 | 160.00 |
| 50 | 5120.00 | in the above described equipment. When heating was protracted beyond the equivalent heating amount, the beneficial effects of heating began to deteriorate.

As can be seen from the data set out in the following specific examples, considerable latitude exists in equipment, time of heating and temperature of heating between insufficient heating to produce observable results or so excessive heating that the beneficial effect is destroyed. For example as shown in the specific data, some beneficial effect was observed upon heating the xanthomonas gum at a temperature of 80°C. for a period of 60 minutes, namely an increase in viscosity of about 500 cps. Upon heating for a period of 16 hours the beneficial effect continued to increase and the viscosity of the final blend was increased by 4,200 cps. On the other hand, the data show that heating for 30 minutes at a temperature of 125°C. produced a viscosity of 9,400 cps in the final sol. When the heating was continued for a period of 240 minutes, a viscosity of 4,000 cps was observed. When heating at a temperature of 150°C., it was found that the maximum viscosity was obtained when heating was conducted for 5 minutes. Thereafter, continued heating resulted in a decrease in viscosities from the viscosity obtained at the 5 minute period. Some beneficial effect, however, was still observed when the heating was continued to 10 and 15 minute periods.

The pretreatment of the xanthomonas gum is carried out after the solvent or liquid media has been evaporated from the gum and the moisture range of the gum is from about 6 percent to 15 percent by weight. Preferably the preceding evaporating step was conducted at sufficiently low temperatures to preserve the hydration quality of the gum. The pretreatment can immediately follow the evaporating step or can be carried out at some later time. The xanthomonas gum can be in either the fibrous or ground form. Due to better heat transfer properties, the fibrous form is preferred. Combining the pretreatment step with the evaporating step is difficult. Until the evaporating step is completed, the exterior area of the gum fiber may have reached the moisture range of about 6 to 15 percent but the interior area has a higher moisture content. Hence by the time the interior was dry enough to be beneficially altered, the exterior area would be subjected to insolubilization through overheating and would not be beneficially altered to interact with guar because of overheating. Once both the interior and exterior areas of the gum particles reach the required moisture range, then pretreatment can be applied. Although the preferred method of pretreating is to treat the xanthomonas gum alone, pretreating can be applied to the blends of xanthomonas gum and guar gum.

It has also been found that unexpected viscosity increases occur over almost the entire range of guar gum-xanthomonas gum ratios. The maximum unexpected increases were obtained when the blends of pretreated xanthomonas gum and guar gum contained about 10 to 25 percent pretreated xanthomonas gum by weight. This pretreated xanthomonas gum to guar gum ratios also produced the greatest increase in unexpected gel strength.

The above blends of pretreated xanthomonas gum and guar gum are particularly useful as printer's paste thickeners for wet-on-wet printing of textiles. Because of its high gel strength, xanthomonas gum alone has been highly successful in this industrial application. As can be seen from the data in Example VII, the gum blends of the present invention at half the concentration of xanthomonas gum along produce the same gel strength. Therefore, less thickening agent is required when the blends are used than when xanthomonas gum alone is used. It is also shown in Example VII that films of the blends are more soluble in water than are the films of xanthomonas gum alone. Therefore, the washout of the paste after printing is improved.

Set out below are specific examples illustrating the pretreatment of the xanthomonas gum and the observations made on the aqueous sols of the xanthomonas gum and guar gum blends. The viscosity measurement used to define the sols were made using a Brookfield LVT Viscometer. The temperature of all the samples was 25°C. The gel strengths of the sols of the blends were measured using a Model 35 Fann VG Viscometer according to the following procedure. The particular sol was agitated for 1 minute at 600 rpm. Agitation was stopped and the sol kept in a quiescent state for 3 minutes. Agitation was again started at 3 rpm and the maximum deflection on the dial was recorded. The dial reading was recorded in terms of pounds per 100 square feet.

EXAMPLE I

Types of Heating

This example shows the comparative speed of convection heating, conductive heating and irradiation heating in altering the xanthomonas gum so that it will interact with guar gum upon hydration.

To carry out the conductive heating, 10 gram samples of xanthomonas gum were placed in pyrex test tubes measuring 1.6 cm I.D. and 15.2 cm in length. The open end of the test tubes were closed with notched stoppers to provide for the escape of gases which may form during the thermal treatment. The test tubes were immersed in a hot oil bath at a depth where the top of the gum and oil were about in the same plane. The oil were preheated to a temperature 10°C. more than the planned temperature at which the gum was to be treated. The apparatus consisted of a hot plate with a rheostat to control the temperature, a stainless steel beaker to hold the hot oil and a disc made of transite having a circle of 8 holes evenly spaced to hold the test tubes. After heating, the tubes and contents were cooled and the heat treated gum was transferred to jars and capped.

To carry out the heat treatment using convection heating, ten gram samples of xanthomonas gum were placed in a forced air oven. To carry out the heat treatment by irradiation heating, the gum was heated by an infrared lamp positioned about 3 inches from the gum. The gum temperature during conductive and irradiation heating was 100°C. During convective heating the oven temperature was 100°C. In heating by all three methods the time of heating was 30 minutes. All of the xanthomonas gum samples had a moisture content of 8 percent by weight and the sodium-potassium balance was about 50 to 75 percent sodium.

The heat treated xanthomonas gum was then blended with guar gum in the ratio of 1 to 4 parts by weight. Sols of 1 percent concentration of the blends by weight were made by weighing into a Waring Blendor cup 495 grams of distilled water, agitating the water at a speed that formed a vortex of half the distance between the water surface and the impeller blades and then adding 5 grams of the gum blends into the vortex. Agitation was continued for 2 minutes and then stopped. The sols were transferred to 600 ml. beakers, covered with a watch glass and placed in a water bath having a temperature of 25°C. The sols were allowed to age for given intervals of time. Shown below in Table 1 are the viscosities of sols of the blends containing xanthomonas gum heated in the three ways described above. Also shown is the viscosity of a sol containing xanthomonas gum which was not heated at all. The viscosities were measured with a Brookfield LVT Viscometer equipped with a No. 4 spindle rotating at 30 rpm.

TABLE 1

Effect of Type of Heating of Xanthomonas Gum Upon Sols of Blends of Guar Gum and Xanthomonas Gum

| Sol Age | Not Heated cps | Convection cps | Conduction cps | Infrared cps |
| --- | --- | --- | --- | --- |
| 60 min. | 3500 | 3700 | 4500 | 8600 |
| 120 min. | 3700 | 3700 | 4800 | 9000 |
| 240 min. | 4200 | 4300 | 5200 | 9000 |
| 24 hrs. | 4200 | 5100 | 5600 | 9000 |

As can be readily seen, the rate of change in the xanthomonas gum increased as the efficiency of the heating arrangement increased.

EXAMPLE II

Very Prolonged Heating

A sample of xanthomonas gum was placed in a glass jar, sealed with a metal cap and placed in a forced draft oven at a temperature of 47°C. for a period of 3 months. The sample was then removed from the oven and blended with an equal weight of guar gum. The moisture content of the sample was 9 percent at the beginning of heating and at the end of heating. The potassium-sodium balance was about 50 to 75 percent sodium. The viscosity characteristics of 1 percent sols of the treated xanthomonas gum, a corresponding untreated sample of xanthomonas gum, a blend of treated xanthomonas gum with guar gum, a blend of untreated xanthomonas gum with guar gum and guar gum alone are shown below. The viscosity readings were taken with a Brookfield Viscometer equipped with a No. 4 spindle rotating at 30 rpm. at a temperature of 25°C.

TABLE 2

After Prolonged Heating of Xanthomonas Gum
Viscosity of 1% Sols

| Sol Age | Unheated Xanthomonas Gum | Heated Xanthomonas Gum | Guar Gum | Blend of Unheated Xanth. Gum and Guar | Blend of Heated Xanth. Gum and Guar |
|---|---|---|---|---|---|
| | cps | cps | cps | | |
| 1 hr. | 2200 | 3000 | 4000 | 2000 cps | 3800 cps |
| 2 hrs. | 2300 | 3000 | 4300 | 2300 cps | 4500 cps |
| 3 hrs. | 2300 | 3000 | 4300 | 2400 cps | 4500 cps |
| 4 hrs. | 2300 | 3000 | 4300 | | |
| 24 hrs. | 2300 | 3100 | 4500 | 3100 cps | 5200 cps |

The above data show that at relatively low temperatures xantomonas gum, if heated long enough, can be induced to change so that it will interact with guar gum to produce sols having unexpected high viscosities.

EXAMPLE III

Conductive Heating at Different Times and Temperatures

Using the method of conductive heating described in Example I, a series of xanthomonas gum samples having a moisture content of 8 percent were heated at various temperatures and for various time periods. The sodium-potassium balance in the gum was about 50 to 75 percent sodium. The samples were then made up into blends containing 20 percent untreated xanthomonas gum by weight and 80 percent guar gum by weight and 20 percent pretreated xanthomonas gum by weight and 80 percent guar gum by weight. These blends were then made up into 1 percent sols by weight using hte method described in Example I. The temperature of heating, the time period of heating and the age of the sol are shown in Tables 3 through 7. The viscosity measurements were made using a Brookfield LVT Viscometer equipped with a No. 4 spindle rotating at 30 rpm. All measurements were made at a temperature of 25°C.

TABLE 3

Viscosity Profile of Sols Prepared in Distilled Water of 1% Guar Alone By Weight, Xanthomonas Gum Alone By Weight, And the Calculated and Measured Viscosities of Sols of a Blend Containing 80% Guar and 20% Untreated Xanthomonas Gum By Weight

| Sol Age (All at 1% Gum Concentration minutes | 100% Guar Gum | 100% Untreated Xanthomonas Gum | 80:20 Blend of Guar and Untreated Xanthomonas (measured) | 80:20 Blend of Guar and Untreated Xanthomonas (calculated)** |
|---|---|---|---|---|
| | cps | cps | cps | cps |
| 30 | 3700 | 2300 | 3200 | 3420 |
| 60 | 4100 | 2400 | 3500 | 3760 |
| 120 | 4300 | 2400 | 3700 | 3940 |
| 240 | 4400 | 2400 | 4200 | 4020 |

**Calculated by adding 80% of the guar gum visc. to 20% of the xanthomonas gum visc.

TABLE 4

Viscosity Profile of Aqueous Sols Containing 1% Gum Blends By Weight, The Blends Containing 80% Guar Gum and 20% Xanthomonas Gum. The Xanthomonas Gum Portion in Each Respective Blend Was Heated at 80°C. Gum Temperature For The Time Periods Shown Below

| | None | 60 min. | 120 min. | 180 min. | 300 min. | 16 |
|---|---|---|---|---|---|---|
| Sol Age | cps | cps | cps | cps | cps | cps |
| 30 min. | 3200 | 3500 | 3400 | 3500 | 3900 | 6400 |
| 60 min | 3500 | 4000 | 3900 | 3900 | 4100 | 7300 |
| 120 min | 3700 | 4300 | 3900 | 4100 | 4400 | 7600 |
| 240 min | 4200 | 4700 | 4400 | 4700 | 4900 | 8000 |
| 24 hr | 4200 | 4700 | 5600 | 5700 | 6000 | 8400 |

TABLE 5

Viscosity Profile of Aqueous Sols Containing 1% Gum Blends By Weight; The Blend Containing 80% Guar Gum and 20% Xanthomonas Gum. The Xanthomonas Gum Portion in Each Respective Blend Was Heated at 100°C. Gum Temperature For The Time Periods Shown Below

| | 30 min. | 60 min. | 240 min. | 300 min. |
|---|---|---|---|---|
| Sol Age | cps | cps | cps | cps |
| 30 min. | 4000 | 5200 | 7700 | 6700 |
| 60 min. | 4500 | 5900 | 7800 | 7200 |
| 120 min. | 4800 | 6100 | 8200 | 7800 |
| 240 min. | 5200 | 6400 | 8200 | 7700 |
| 24 hrs. | 5600 | 7200 | 8400 | 7700 |

TABLE 6

Viscosity Profile of Aqueous Sols Containing 1% Gum Blends By Weight; The Blend Containing 80% Guar Gum and 20% Xanthomonas Gum By Weight. The Xanthomonas Gum Portion in Each Respective Blend was Heated at 125°C. Gum Temperature For The Time Periods Shown Below

| | 30 min. | 60 min. | 240 min. | 300 min. |
|---|---|---|---|---|
| Sol Age | cps | cps | cps | cps |
| 30 min. | 7600 | 6900 | 3200 | 2900 |
| 60 min. | 8400 | 7200 | 3300 | 3300 |
| 120 min. | 9400 | 7600 | 3500 | 3600 |
| 240 min. | 9400 | 7600 | 3700 | 3600 |
| 24 hrs. | 9400 | 7800 | 4000 | 4000 |

TABLE 7

Viscosity Profile of Aqueous Sols Containing 1% by Weight Pretreated Xanthomonas Gum Alone and Gum Blends; the Blend Containing 80% Guar Gum and 20% Xanthomonas Gum. The Xanthomas Gum Portion in Each Respective Blend Was Heated at 150° C. Gum Temperature for the Time Periods Shown Below

| | Centipoises | | | | | | | |
|---|---|---|---|---|---|---|---|---|
| | <5 min.* | 5 min. | 10 min. | 15 min. | 30 min. | 60 min. | 180 min. | 240 min. |
| Sol age: | | | | | | | | |
| 30 min | 6,700 | 8,100 | 8,300 | 4,000 | 2,600 | 2,400 | 1,900 | 2,100 |
| 60 min | 7,400 | 9,100 | 8,400 | 4,400 | 2,900 | 2,700 | 2,300 | 2,200 |
| 120 min | 7,600 | 9,200 | 8,800 | 4,700 | 3,000 | 2,800 | 2,400 | 2,500 |
| 240 min | 8,200 | 9,300 | 8,600 | 5,000 | 3,200 | 2,800 | 2,600 | 2,500 |
| 24 hrs | 8,600 | 9,700 | 8,700 | 5,600 | 3,700 | 3,300 | 2,700 | 2,500 |
| Sol aged 24 hrs. of Xanthomonas gum heated but unblended | | 3,400 | | 500 | Nil | | Nil | |

*Heating time was not recorded until the gum reached 150° C. 10 minutes elapsed before the gums reached 150° C.

EXAMPLE IV

Gum Ratios

Xanthomonas gum that had been treated to 120°C. for 20 minutes and developed 28 cps viscosity at 0.5 percent concentration was blended with guar that yielded 44 cps viscosity at 0.5 percent concentration in the ratios shown in Table 8 below. The viscosities shown in the table were measured with a Fann Viscometer 35 VG, No. 1 spring rotating at 300 rpm. All sols were at 25°C. Gel strength of these sols was measured with a Fann Viscometer according to the method described above. The gel strength numbers are given in pounds per 100 square feet. The moisture content of the xanthomonas gum was 8 percent by weight and the sodium-potassium balance was about 50 to 75 percent sodium.

TABLE 8

| % Guar Gum | % Xanthomonas Gum | Viscosity of 0.5% Sol, cps | Gel Strength, lbs/100 sq. ft. |
|---|---|---|---|
| 100 | 0 | 44 | Nil |
| 90 | 10 | 53 | 15 |
| 80 | 20 | 50 | 14 |
| 70 | 30 | 44 | 11 |
| 60 | 40 | 40 | 10 |
| 50 | 50 | 36 | 10 |
| 30 | 70 | 31 | 11 |
| 10 | 90 | 38 | 12 |
| 0 | 100 | 28 | 12 |

These data show that a ratio of about 10 to 25 percent of xanthomonas gum in a blend composed of xanthomonas gum and guar gum yielded the maximum viscosity and gel strength as compared to xanthomonas gum alone. The data also show that some increase in viscosity was exhibited over the entire ratio range.

EXAMPLE V

Pretreating Xanthomonas Gum And Guar Gum Blends

Untreated xanthomonas gum having a moisture content of 8 percent and a sodium-potassium balance of 50 to 75 percent sodium was dry blended with guar gum in the amounts of 80 percent guar gum and 20 percent xanthomonas gum by weight. Samples of the blended gums and the individual gums were then subjected to conductive heating as described in Example I. Viscosities developed in aqueous sols containing 1 percent of the individual gums and the blended gums are shown in Tables 9 and 10.

The viscosities were measured using a Brookfield Viscometer LVT equipped with a No. 4 spindle rotating at 30 rpm.

TABLE 9

Blended Gums and Individual Gums Heated at 100° C. Gum Temperature for 3 Hours

| Sol age | 80% guar, 20% Xanthomonas gum unheated, cps. | 80% guar, 20% Xanthomonas gum previously heated to 100° C. for 3 hours, cps. | 80% guar, heated to 100° C. for 3 hours, 20% untreated Xanthomonas gum, cps. | 80% guar, 20% Xanthomonas gum mixture heated to 100° C. for 3 hours, cps. |
|---|---|---|---|---|
| 30 min | 2,900 | 6,000 | 2,900 | 4,500 |
| 60 min | 3,300 | 6,500 | 3,300 | 5,000 |
| 120 min | 3,700 | 6,800 | 3,500 | 5,100 |
| 240 min | 4,300 | 7,500 | 4,400 | 5,500 |
| 24 hrs | 5,300 | 8,100 | 4,900 | 6,800 |

TABLE 10

Blended Gums and Individual Gums Heated at 150° C. Gum Temperature for 5 Minutes

| Sol age | 80% guar, 20% Xanthomonas gum unheated, cps. | 80% guar, 20% Xanthomonas gum previously heated to 150° C. for 15 minutes, cps. | 80% guar, heated to 100° C. For 3 hours, 20% untreated Xanthomonas gum, cps. | 80% guar, 20% Xanthomonas gum mixture heated to 150° C. for 15 minutes, cps. |
|---|---|---|---|---|
| 30 min | 2,900 | 8,000 | 2,900 | 7,100 |
| 60 min | 3,300 | 8,500 | 3,300 | 8,000 |
| 120 min | 3,700 | 8,700 | 3,800 | 8,000 |
| 240 min | 4,300 | 9,100 | 4,500 | 8,800 |
| 24 hrs | 5,300 | 9,300 | 4,900 | 9,300 |

The above data show that heating the guar gum alone produced no beneficial effects. They also show that increased viscosities can be obtained by heating mixtures of guar and xanthomonas gum. They further show that heating the xanthomonas gum prior to blending is the most efficient method of producing blends yielding high viscosities upon hydration.

EXAMPLE VI

Xanthomonas Gum Having Sodium-Potassium Balance of 50 to 75% Potassium

Xanthomonas gum made by using predominantly potassium salts rather than sodium salts were subjected to conductive heating as described in Example I at a temperature of 150°C. for a period of 5 minutes. The moisture content of the gum was 8 percent by weight. The treated xanthomonas gum and a corresponding untreated sample of xanthomonas gum were then blended with guar gum in amounts of 80 percent guar and 20 percent xanthomonas gum. The viscosities developed in aqueous sols containing 1 percent by weight of the blends are shown in Table 11.

TABLE 11

Xanthomonas Gum Having Sodium-Potassium Balance of 50% to 75% Potassium

| Sol Age | 100% Xanthomonas Gum Unheated | 80% Guar 20% Xanthomonas Gum Unheated | 80% Guar 20% Xanthomonas Gum Heated to 150°C. For Five Minutes |
|---|---|---|---|
| | cps | cps | cps |
| 30 min. | 2200 | 2000 | 8400 |
| 60 min. | 2100 | 2400 | 8800 |
| 120 min. | 2300 | 3200 | 8900 |
| 240 min. | 2100 | 3700 | 8800 |
| 24 hrs. | 2100 | 4500 | 8600 |

The data show that the effect of pretreating is beneficial with xanthomonas gum made using predominantly potassium salts as well as xanthomonas gum made by using predominantly sodium salts.

EXAMPLE VII

Comparison of Viscosity Profile and Gel Strength With Xanthomonas Gum Alone as Evaluation of Printing Paste Thickener A xanthomonas gum was heated between 110°–120°C. for 20 minutes during the final step of its manufacture when the moisture content was 8 percent by weight. The sodium-potassium balance was about 50 to 75 percent sodium. A 1 percent sol of this gum developed 2,400 cps. viscosity at 25°C. measured with Brookfield LVT, No. 4 spindle, 30 rpm which is the typical viscosity for a xanthomonas gum to be used for thickening printer's paste. Ten parts by weight of this gum was dry blended with 90 parts of guar gum. A 1 percent by weight sol of the guar gum used in this blend yielded 44 cps at 25°C.

Sols at 1 percent by weight concentration of untreated xanthomonas gum and of the blends were made by weighing into a Waring Blendor cup 495 g. of distilled water, agitating the water at a speed that formed a vortex one-half the distance between the water surface and impeller blades and then adding 5 g. of gum into the vortex. Agitation was continued for 2 minutes and stopped. The sols were then transferred to a 600 ml. beaker, covered with a watch glass and placed in a water bath at 25°C. Viscosities were measured at various intervals with a Brookfield LVT Viscometer and after the 1 percent sols had developed their maximum viscosity, their viscosities were measured at three rates of shear. The sols were diluted to 0.5 and 0.1 percent concentration and the viscosity of sols at both concentrations were measured at three rates of shear. Table 12 summarizes the results.

TABLE 12

A Comparison of the Rheology of Xanthomonas Gum With a Blend

| Viscometer Brookfield LVT | Spindle No. | RPM | Gum Conc. | 100% Xanth. Gum, cps | 90% Guar 10% Xanth. Blend, cps |
|---|---|---|---|---|---|
| " | 4 | 60 | 1.0% | 1350 | 4450 |
| " | 4 | 30 | 1.0% | 2400 | 8100 |
| " | 4 | 12 | 1.0% | 5200 | 18750 |
| " | 3 | 60 | 0.5% | 460 | 1370 |
| " | 3 | 30 | 0.5% | 820 | 2600 |
| " | 3 | 12 | 0.5% | 1800 | 5550 |
| " | 1 | 60 | 0.1% | 46 | 49 |
| " | 1 | 30 | 0.1% | 72 | 76 |
| " | 1 | 12 | 0.1% | 125 | 120 |
| " | 1 | 6 | 0.1% | 195 | 190 |
| Gel Strength | | | 1.0% | 28 | 78 |
| Gel Strength | | | 0.5% | 6 | 28 |

These data show that the gel strength and viscosity of the 90:10 guar-xanthomonas gum blend at 0.5 percent concentration equals that of untreated xanthomonas gum at 1 percent concentration.

Dried films on glass of the blend of xanthomonas gum and of guar gum were prepared by spreading the 1 percent sol on a glass plate using a Doctor Blade having a 0.005 inch opening. After the films had dried 72 hours, the speed of redissolving was measured by placing a drop of water on the dried film and wiping it from the glass at 1- to 10-second time intervals. The completeness of film removal was observed by looking through the glass. The xanthomonas gum film required 2 seconds exposure to the water for complete solution. The guar gum film required 10 seconds of exposure to the water for complete solution. The blend film required 1 second of exposure to the water for complete solution. Hence the blend films dissolve more readily than the films of xanthomonas gum itself.

The embodiments of the invention in which an exclusive property or privilege is claimed are defined as follows:

1. A thickener blend comprising about 5 to 95 percent guar gum by weight and about 5 to 95 percent xanthomonas gum by weight, said xanthomonas gum having been pretreated by heating at a moisture content of about 6 to 15 percent at a temperature and for a period of time to induce a capability in the xanthomonas gum for interacting with the guar upon hydration of the blend whereby viscosities in excess of the additive viscosities of the xanthomonas gum and the guar gum are produced.

2. The thickener blend of claim 1 wherein the xanthomonas gum is pretreated by convection heating.

3. The thickener blend of claim 1 wherein the xanthomonas gum is pretreated by irradiation heating.

4. The thickener blend of claim 1 wherein the xanthomonas gum is pretreated by conduction heating.

5. The thickener blend of claim 1 wherein the xanthomonas gum is pretreated by heating the xanthomonas gum to a temperature between about 47° to 180°C.

6. The thickener blend of claim 5 wherein the xanthomonas gum is pretreated prior to blending with the guar gum.

7. The thickener blend of claim 5 wherein the xanthomonas gum is pretreated after blending with the guar gum.

8. The thickener blend of claim 5 wherein the proportions of guar gum and pretreated xanthomonas gum are about 75 to 90 percent guar gum by weight and about 10 to 25 percent pretreated xanthomonas gum by weight.

9. The thickener blend of claim 5 wherein the xanthomonas gum was pretreated by heating to a temperature between about 47°C. to 150°C.

10. The thickener blend of claim 5 wherein the xanthomonas gum is pretreated by heating the xanthomonas gum to a temperature of from about 80° to 180°C. for a period of time of about 0.6 minutes to about 16 hours, the temperature range being combined with the time period range in inverse relationship, said heating inducing a capacity in the xanthomonas gum for interacting with guar gum and said heating being terminated prior to destroying said capacity.

* * * * *

PO-1050
(5/69)

UNITED STATES PATENT OFFICE
CERTIFICATE OF CORRECTION

Patent No. 3,765,918     Dated October 16, 1973

Inventor(s) Wesley A. Jordan and Walter H. Carter

It is certified that error appears in the above-identified patent and that said Letters Patent are hereby corrected as shown below:

Col. 1, line 10, "has industrial" should read --has many industrial--; line 16, "material" should read --materials--. Col. 3, line 25, "100°" should read --110°--. Col. 5, line 56, "measurement" should read --measurements--. Col. 6, line 17, "were" should read --was--. Col. 7, line 62, "hte" should read --the--. Col. 8, line 31 of the table, "16" should read --16 hrs.--. Col 12, line 27, "heating at" should read --heating while at--; line 28, "temperature and" should read --temperature between about 47°C. to 180°C. and--. Claim 5, cancel in its entirety. Col. 12, line 43, "claim 5" should read --claim 1--; line 46, "claim 5" should read --claim 1--; line 49, "claim 5" should read --claim 1--; line 54, "claim 5" should read --claim 1--; line 57, "claim 5" should read --claim 1--.

Signed and sealed this 26th day of March 1974.

(SEAL)
Attest:

EDWARD M. FLETCHER, JR.
Attesting Officer

C. MARSHALL DANN
Commissioner of Patents